United States Patent [19]
Goto

[11] Patent Number: 5,373,345
[45] Date of Patent: Dec. 13, 1994

[54] CAMERA EXPOSURE METER SYSTEM

[75] Inventor: Tetsuro Goto, Funabashi, Japan

[73] Assignee: Nikon Corporation, Tokyo, Japan

[21] Appl. No.: 152,149

[22] Filed: Nov. 16, 1993

[30] Foreign Application Priority Data

Nov. 20, 1992 [JP] Japan .................................. 4-335384

[51] Int. Cl.$^5$ .............................................. G03B 7/28
[52] U.S. Cl. .................................................. 354/432
[58] Field of Search ............... 354/429, 432, 410, 446, 354/456

[56] References Cited

U.S. PATENT DOCUMENTS

| 4,978,990 | 12/1990 | Yamasaki et al. | 354/432 |
| 5,226,984 | 11/1993 | Muramatsu et al. | 354/432 |
| 5,227,830 | 7/1993 | Yoshihara et al. | 354/432 X |

FOREIGN PATENT DOCUMENTS 4-215631 8/1992 Japan .
4-251230 9/1992 Japan .

Primary Examiner—W. B. Perkey
Attorney, Agent, or Firm—Oliff & Berridge

[57] ABSTRACT

The speed of a light metering system that performs divided brightness measurements is increased by omitting the computations used to calculate the suitable exposure conditions when the metered signals output by the lightmeter are nearly identical to metered signals stored in the light meter from a previous metering operation. In such a case, the exposure operation is performed using exposure conditions that were previously calculated for the stored metered signals.

15 Claims, 7 Drawing Sheets

CAMERA EXPOSURE METER SYSTEM

BACKGROUND OF THE INVENTION

1. Field of the Invention

The present invention relates to an exposure meter system for cameras. More specifically, it relates to a technique for use in an exposure meter system that measures brightness in divided areas. The technique makes quick exposure control possible by eliminating the computing operation for obtaining exposure data under specified conditions.

2. Description of Related Art

In the conventional art, a camera is provided with an exposure meter system to measure the level of illumination of the subject so that suitable exposure can be accomplished. Based on the illumination value obtained by means of such a light metering system, the processing circuits in the camera determine the shutter time and lens aperture stop value so that an appropriate amount of exposure can be given to the film.

Heretofore, the metering system was of a type that measures light weighted mainly in the center of the frame. In recent years, however, it has become more prevalent for the illumination to be measured in more than one area of the subject. This type of meter measuring method is generally referred to as divided brightness measurement. In the metering, the subject image is divided into about 5 or more areas, including the center area and two or more peripheral areas. With this measurement, brightness in the center area of the subject and in the peripheral areas are compared with each other to determine the optimum exposure conditions.

In accomplishing divided brightness measuremenn, the greater the number of divisions the higher the probability of obtaining the correct exposure conditions for the main (center) area as well as for the peripheral areas, because in this manner a more detailed distribution of illumination can be obtained for these areas. Therefore, the number of divisions with divided brightness measurement tends to become increasingly greater. In the future, due to improvements in photocells, the number of divisions is expected to range from several tens to several hundreds.

With cameras in which the above-described divided brightness measurement is accomplished, the computing circuits require little processing time if the number of divisions is kept to a minimum. However, if the number of divisions increases to from several tens to several hundreds or more, the process complexity approaches that of so-called image processing.

This requires a very long processing time before the optimum exposure conditions can be obtained. With a camera in which the use of a one chip CPU is necessitated because of space limitations, and in which the CPU has to perform many processes, including the range-finding process, exposure-controlling process and many other processes, not to mention the light-metering operations, a long time is required in order to obtain the above-described optimum exposure conditions, thereby making instantaneous response on the part of the camera impossible.

SUMMARY OF THE INVENTION

Given the above-described problem as background, an object of the present invention is to offer a quick response camera by eliminating, under certain conditions, the operation time for computing the optimum exposure conditions for a camera having a divided brightness measurement system that utilizes a divided subject image.

In order to accomplish the above and other objects, and to overcome the above and other problems, the exposure meter system of the present invention comprises a light metering means that measures the subject image by dividing it into a plurality of areas and outputting a plural number of metered signals, and a computing means that performs computations using the plural number of metered signals output from the metering means to obtain exposure data. Control of the exposure process is accomplished after the comparison of the latest metered signal from the metering means with the previous metered signal obtained in the previous metering operation so that, when these signals are found to be nearly identical, the previously calculated results can be used for exposure control without the need for accomplishing computations using the above-mentioned computing means.

With the invention being comprised as described above, upon the output of the latest metered signal from the light-metering means, an exposure control means compares the latest metered signal with the previous metered signal. If during the comparison a determination is made that the two signals are nearly identical, the operation of the computing means is by-passed, and exposure processing is accomplished on the basis of the results of the previous computation obtained by the computing means. Therefore, If the conditions of the subject are nearly the same as those obtained in the previous metering, the operation to obtain the optimum exposure data is by-passed, enabling quick exposure processing to be made possible.

The effective speed increase of the process will be greater as the number of divisions, in the divided brightness measurement of the subject image increases.

Specifically, a primary memory and a secondary memory are provided within the exposure-control means. The latest metered signal is stored in the primary memory and the previous metered signal is stored in the secondary memory. A comparison is made to determine whether the contents of these two memories are identical, after which the latest metered signal is transferred to the secondary memory. A new metered signal is then obtained in the next metering, and is stored in the primary memory. By comparing the contents of the primary and secondary memories, a determination can be made as to whether or not the operation of the computing means is required. In this manner, easy exposure control is made possible by means of a microprocessor.

As explained above, the process described by this invention consists of a comparison between the latest metered signal from the metering means with the previous metered signal, and the subsequent omission of the optimum exposure condition computation if the two signals compared are found to be nearly identical with each other, exposure process control being based on the results of the previous computation. This invention has the advantage of eliminating a waste in processing time that could result from a computation that would produce the same or nearly the same result as in the previous computation, the quickening of exposure control and the realization of a camera that is instantaneously responsive.

This invention is especially effective in systems in which the number of divided areas in the exposure sensor is increased as a result of the adoption of a CCD type light metering device, which requires a long computation time. The computation time that has become unnecessary by the adoption of this system is available for other processing. The effect of this invention, therefore, is enhanced as the number of the pixels in the light-metering sensor is increased.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
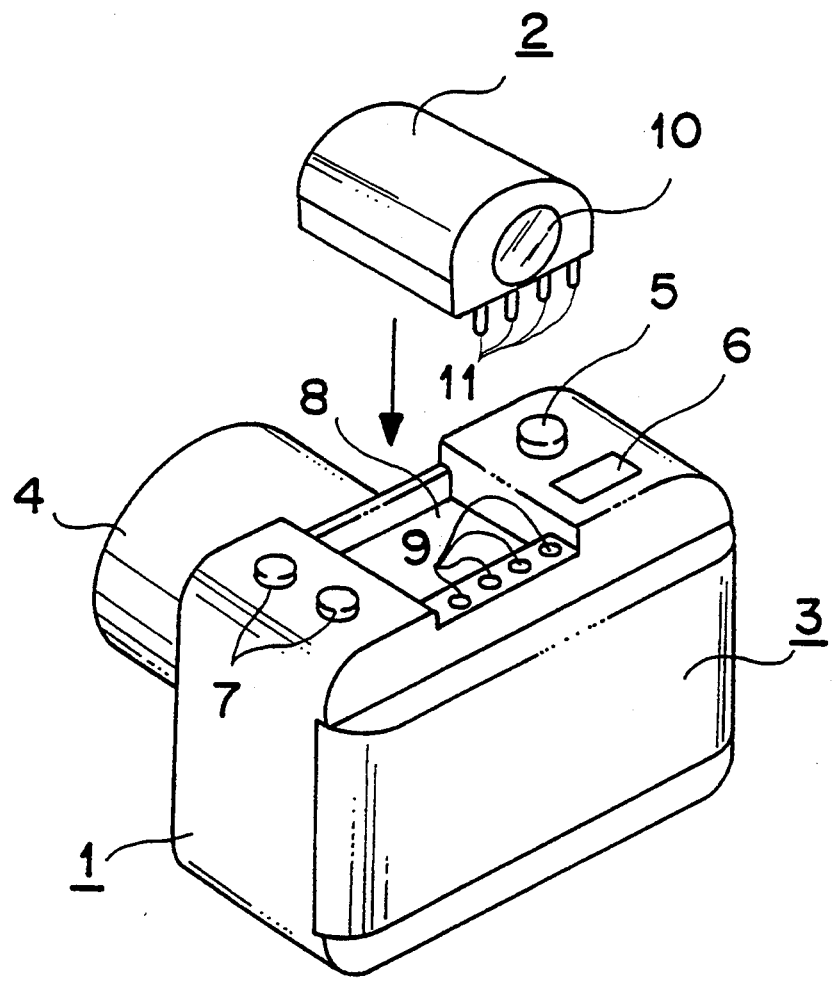
FIG. 1 is an outside view of a camera system in which an embodiment of the exposure meter system of the present invention is integrated.

An embodiment of the present invention is explained hereinafter with reference to the drawings. FIG. 1 shows an outside view of an embodiment of a camera that includes an exposure meter according to the present invention. The camera in this figure comprises a camera body 1 exchangeably equipped with a lens 4, a viewfinder 2, and a back lid 3. The lens 4 is freely attached to or removed from a lens mount which is not shown in this figure. The viewfinder 2 is freely attached to or removed from a screen section 8 as shown in the figure. The back lid 3 is freely attached to or removed from the film accommodation part not illustrated in the figure.

Provided on camera body 1 are a shutter button 5 and a display 6 on the upper right, and various setting buttons 7 on the upper left. The built-in shutter button 5 is comprised of a two-stage switch. Pushing the switch half way down will turn on the power switch to start feeding power to the circuits. When fully depressed, the button 5 turns on a release switch that will start the exposure process.

Light from the subject, which has passed through the lens 4, projects on the screen 8. Placed before the screen 8 is a group of contact points 9. The viewfinder 2, which is removable, is equipped with an eye piece 10, and a group of contact points 11 below the eye piece 10. The contact point group 11, when contacted with the contact point group 9, functions so as to give out and receive signals. The back lid 3 can be opened and closed through a hinge not illustrated. It also is removable.

Figure 2:
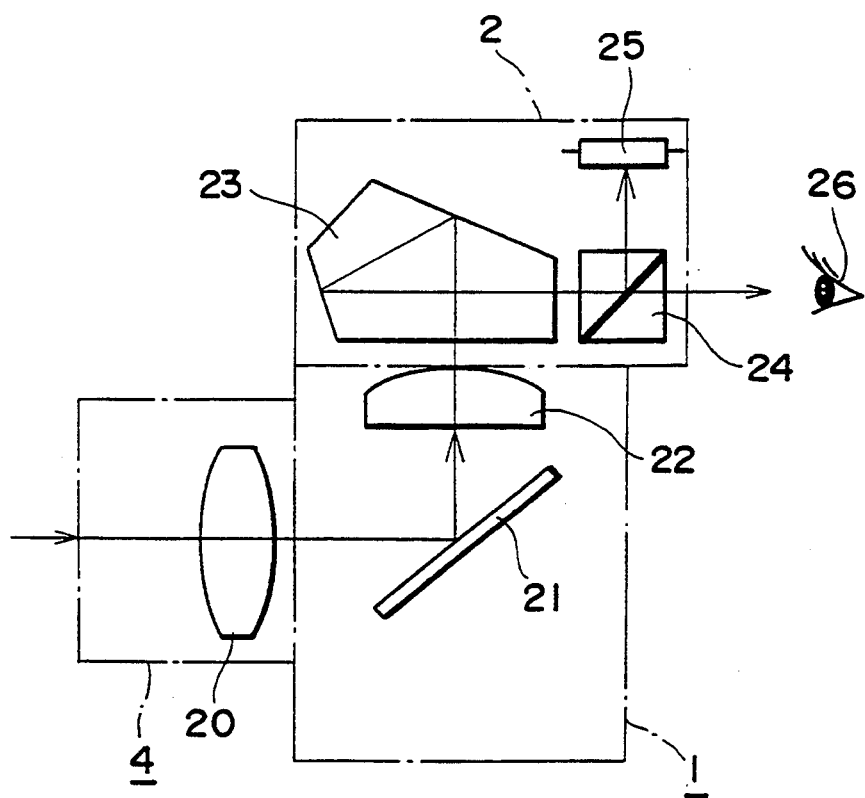
FIG. 2 shows an optical path for the subject light in the camera system of FIG. 1.

Shown in FIG. 2 is a schematic representation of the camera body 1 and the camera's optical system, including the lens 4 and the viewfinder 2 shown in FIG. 1. In FIG. 2, light from the subject (not illustrated) passes through a lens optical system 20 in the lens 4, and is reflected upward by a reflective mirror 21 and passes through optics 22 to form an image. The formed subject image is reflected with a pentaprism 23, so that part of the subject image enters the eye 26 of the observer via a half-mirror 24. The part of the subject image reflected upward by the half-mirror 24 enters a two-dimensional sensor 25 (hereafter referred to as "sensor").

Any type of sensor that generally is in use may be adopted for the sensor 25. Its function is to divide the subject illumination into a plural number of areas, to measure the illumination in each area and to output a metered signal for each area. At this point, a processing circuit, described hereinafter, produces the optimum exposure by performing a predetermined computation on the basis of the metered signals and the sensitivity of the film in use.

Figure 3:
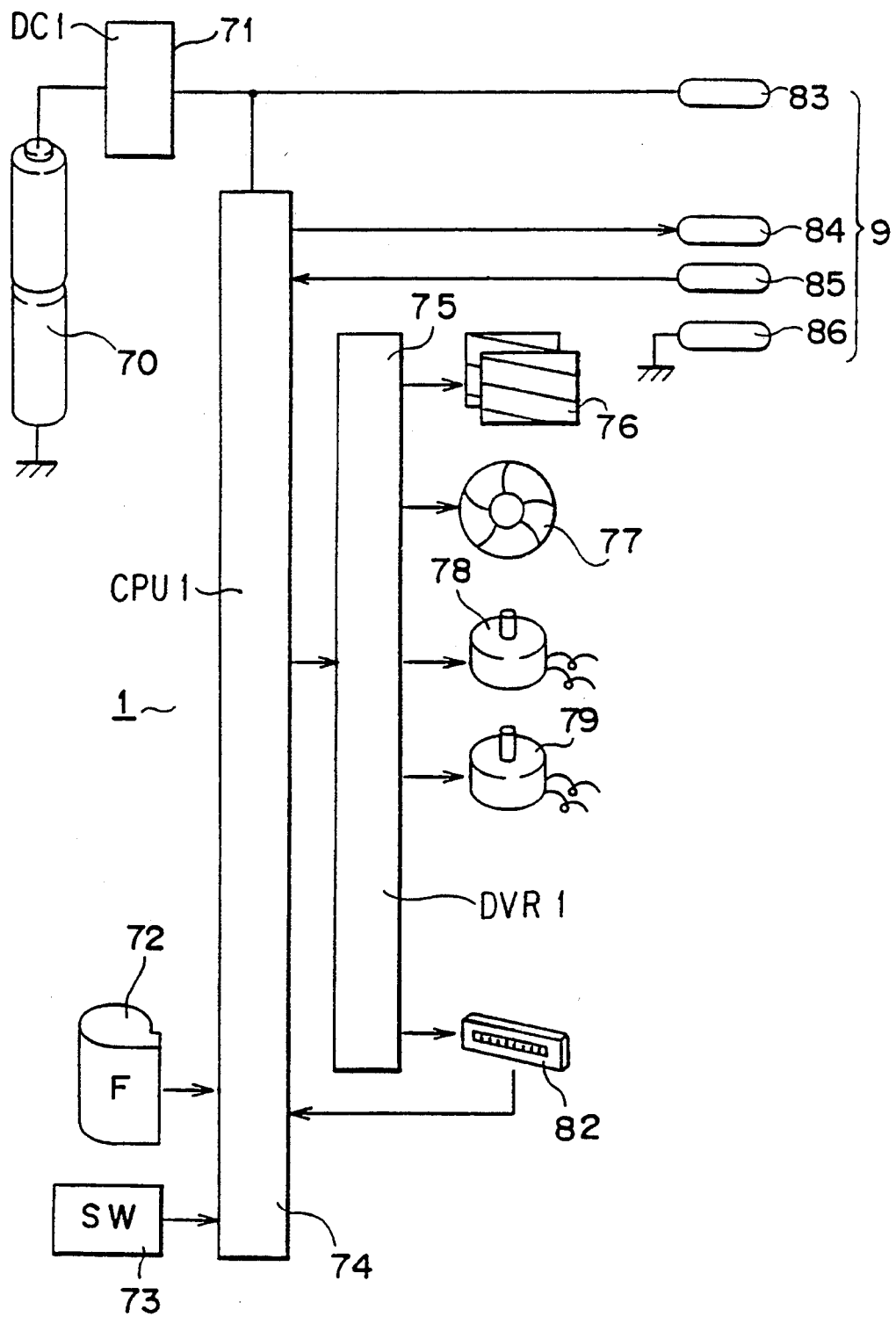
FIG. 3 is a block diagram showing the electrical circuits within the camera body of the FIG. 1 camera system.

FIG. 3 shows an example of electrical circuits provided within the camera body 1. The circuits in FIG. 3 include power supply batteries 70, a DC-DC converter 71, a film sensitivity-detecting circuit 72, a group of switches 73, a CPU 74 and a driver circuit 75, which drives the various sections. Connected to the driver circuit 75 are a shutter 76, an aperture stop 77, motors 78, 79, a focus-detecting device 82, etc.

The batteries 70 feed power to all of the circuits within the camera body 1 through the DC-DC converter 71, and to the circuit within the viewfinder 2 through a contact point 83 at 5V, for example. Power is fed to a circuit within the back lid 3, also through the DC-DC converter 71. However, the contact points for all power feeding are not illustrated in this figure. In addition to the contact point 83, contact points 84, 85 and 86 are contact points used for the exchange of data with the viewfinder 2.

Film sensitivity signals from the film sensitivity-detecting circuit 72 and various switch-related signals from the switch group 73 are input to the CPU 74, which controls all of the camera's operations. For example, command or state signals from the shutter button 5, the selection button 7, or the sequence switch, etc. (not illustrated) are input into the CPU 74. Also input into CPU 74 is a focusing state signal from the focus detecting device 82. Signals relating to suitable exposure conditions originate in the viewfinder 2 and are input to the CPU 74 through the contact point 85, which is one of the contact points (83, 84, 85 and 86) comprising the contact point group 9.

The output of the CPU 74 is comprised of signals controlling exposure time by opening and closing the shutter 76 by means of driving means 75, the control signal that limits the light from the subject by setting the aperture stop 77 at a predetermined value, a signal controlling the winding and rewinding of the film by turning on and off the motor 78, and a control signal that brings the lens 4 into focus by turning on and off the motor 79. In addition, the signal that drives the focus-detecting device 82 also is output from the CPU 74. Furthermore, a display 6, which includes an LCD and other components (both not illustrated) on the upper surface of camera body 1, also is driven by the CPU 74. The CPU 74 also sends out the film sensitivity signal to the viewfinder 2 via contact point 84, as described hereinafter.

Figure 4:
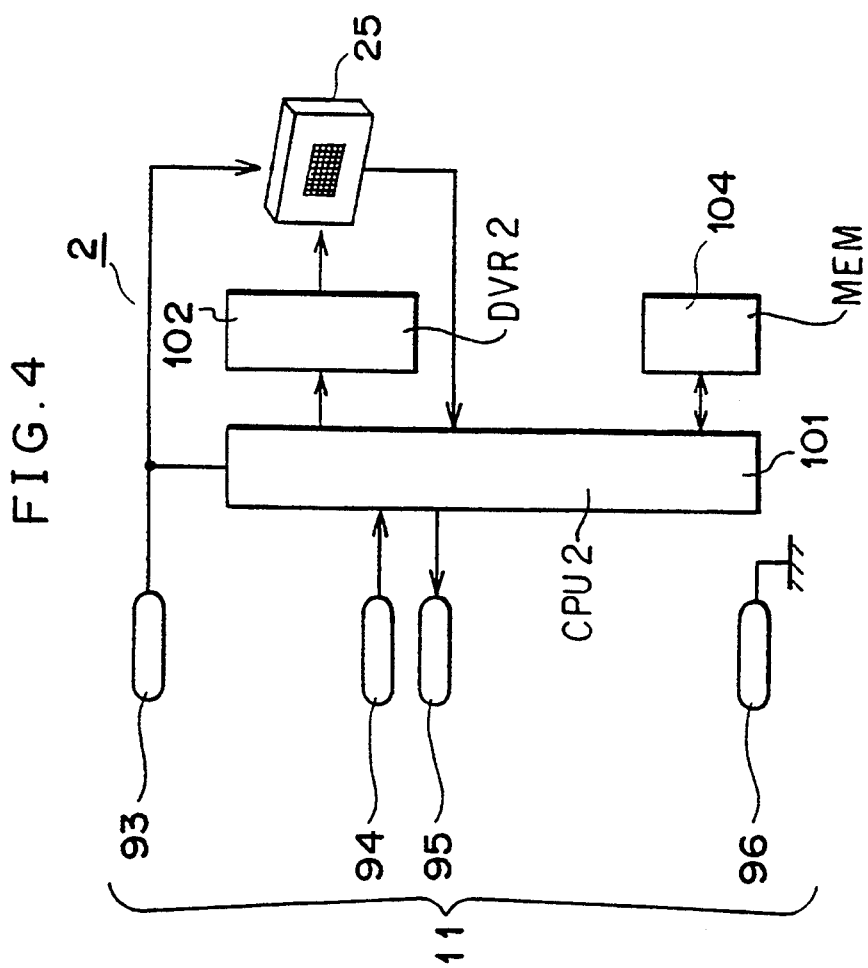
FIG. 4 is a block diagram of the electrical circuits within the finder of the FIG. 1 camera system.

FIG. 4 schematically depicts the configuration of the electrical circuit within the viewfinder 2. The circuit shown in this figure includes a CPU 101, a driver 102, a storage circuit 104, etc. Contact points 93, 94, 95 and 96 comprise the contact points 11 for signal exchange with the camera body 1.

In the circuit shown in FIG. 4, the CPU 101 drives the sensor 25 via driver 102. The subject image signal obtained by measuring the illumination of the subject by means of sensor 25 is sent back to the CPU 101. The subject image signal, which is stored temporarily in a storage circuit 104, is read out when the data is needed for calculation of the optimum exposure conditions, etc. The film sensitivity signal is input from the camera body 1 via contact point 94. The computation of optimum exposure conditions is performed by the CPU 101 on the basis of the film sensitivity signal and the above-mentioned subject image signal. The suitable exposure signal that represents the obtained optimum exposure condition is output to the camera body 1 through the contact point 95.

Figure 5:
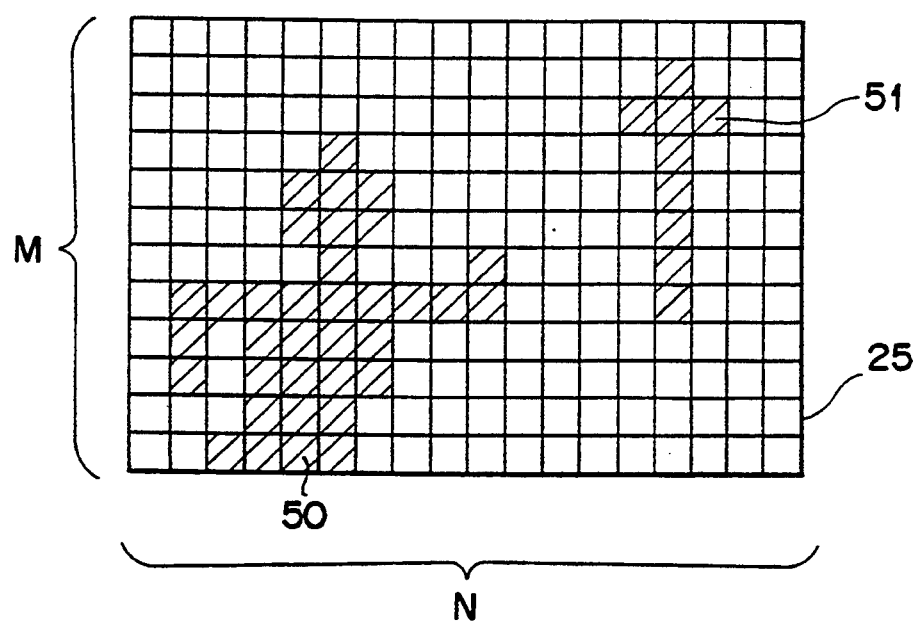
FIG. 5 is a diagram illustrating an example of a subject-recognition image obtained by the sensor used in the exposure meter system of the present invention.

FIG. 5 shows an example of the recognition of the subject image by the sensor 25 (shown in FIGS. 2 and 4). In other words, FIG. 5 is a schematic representation of the subject image stored in the storage circuit 104 in the form of type of illumination level for various detection areas detected by the sensor 25. Shown in FIG. 5 is an example of light metering in which light (or dark) subject images 50 and 51 have been detected or metered in locations in the figure as a uniformly dark (or light) region of illumination. In this instance, the sensor 25 may be a CCD (charge coupled device) with divided brightness measurement areas having elements in M rows and N columns. As is generally known, the signals indicating the results of metering in these metering areas are read out in time series when predetermined clock signals are provided.

The subject image signal stored in the storage unit 104 is subjected to predetermined analysis processing for the computation of the optimum exposure conditions. Although FIG. 5 is represented by means of black and white (dual) density levels for simplification, multidensity levels and color signals also can be stored in an actual storage unit. As shown here, the subject image signal corresponds to many signals from pixels (M by N), and the subject image signal for each area represents multilevel densities, usually a relatively long time being required to analyze them and to compute the optimum exposure conditions. In the application of the present invention under specific conditions, however, quick picture-taking can be made possible by the omission of such analytical processing.

Next, the functions of the camera metering system of the present invention are explained with reference to FIGS. 6 and 7.

Figure 6:
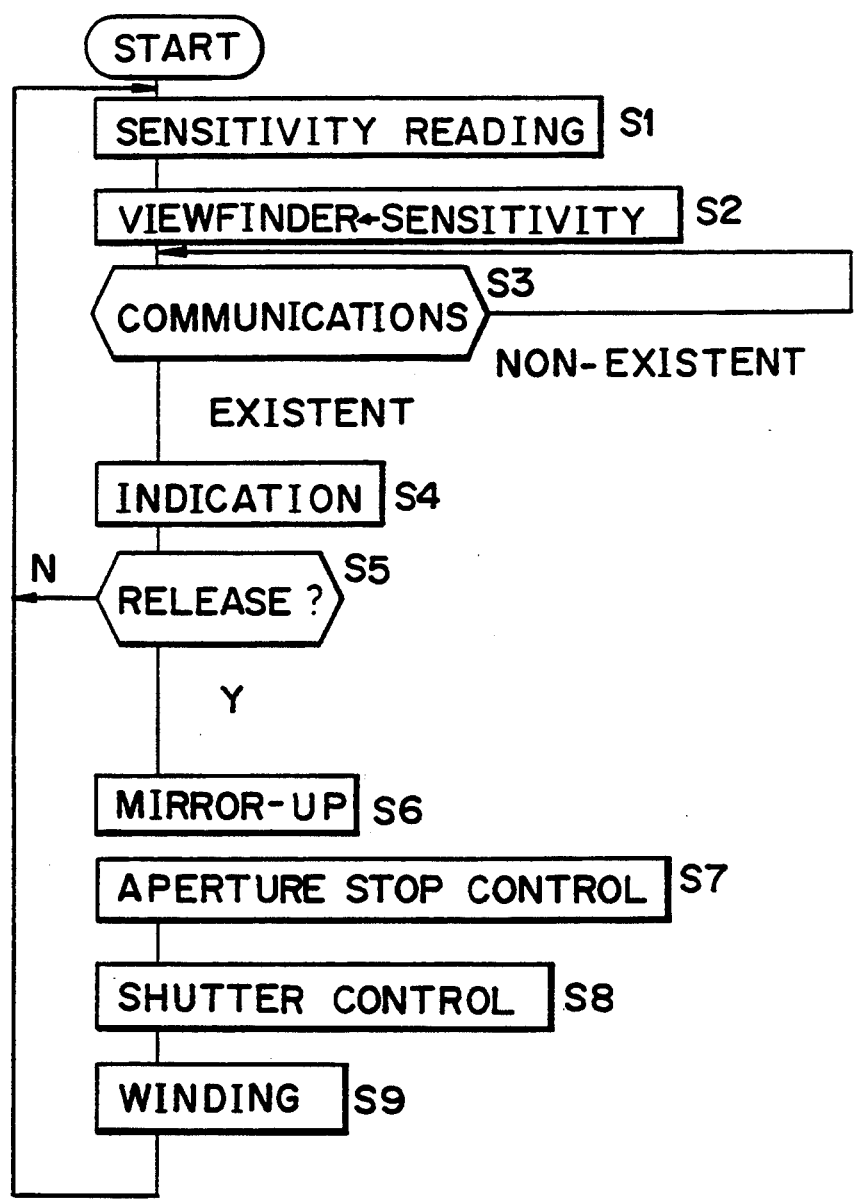
FIG. 6 is a flow chart of the process performed in the CPU in the camera body of the camera system in FIG. 1.

Shown in FIG. 6 is an example of processing performed by the CPU 74 in the camera body 1. The process routine shown in FIG. 6 is repeatedly executed while power is applied to the CPU 74 after the start-up of the DC-DC converter 71. Initially, the sensitivity of the film in use is detected by the film sensitivity detecting circuit 72 in step S1. Then in step S2 the initial handshaking for data exchange is performed with the viewfinder 2 so that film sensitivity obtained in step S1 is transmitted to the viewfinder 2.

Next, in step S3, secondary handshaking for data exchange is performed by means of viewfinder 2, and the CPU waits for the signal sent from the viewfinder 2. The viewfinder 2 computes a suitable exposure signal using, among other things, the film sensitivity signal obtained in step S2. The results are sent to the body 1 in step S4. If a suitable exposure signal is obtained from the viewfinder 2, the above-mentioned display LCD 6 displays data that corresponds to the suitable exposure signal, such as the shutter time and aperture stop value.

Subsequently, in step S5, the shutter button 5 is operated to determine whether exposure action has been commanded. If the command has not been issued, a return to step S1 occurs to repeat the process over again. If the command for exposure action has already been made in step S5, the process moves to step S6. First, the mirror 21 shown in FIG. 2 is raised and retracted from the optical path in step S6. In step S7 which follows, the above-mentioned suitable exposure signal is used to control the aperture stop 77 in the lens 4 to a predetermined value. Next, in step S8, the film is exposed by the opening of shutter 76 for a predetermined time based on the above-mentioned suitable exposure signal. After the completion of the exposure action in the above-described manner, the winding motor 78 is rotated in step S9 to advance the film by one frame, and a return to step S1 is accomplished so that the system can be ready for the next exposure process in which the above-described process is repeated.

Figure 7:
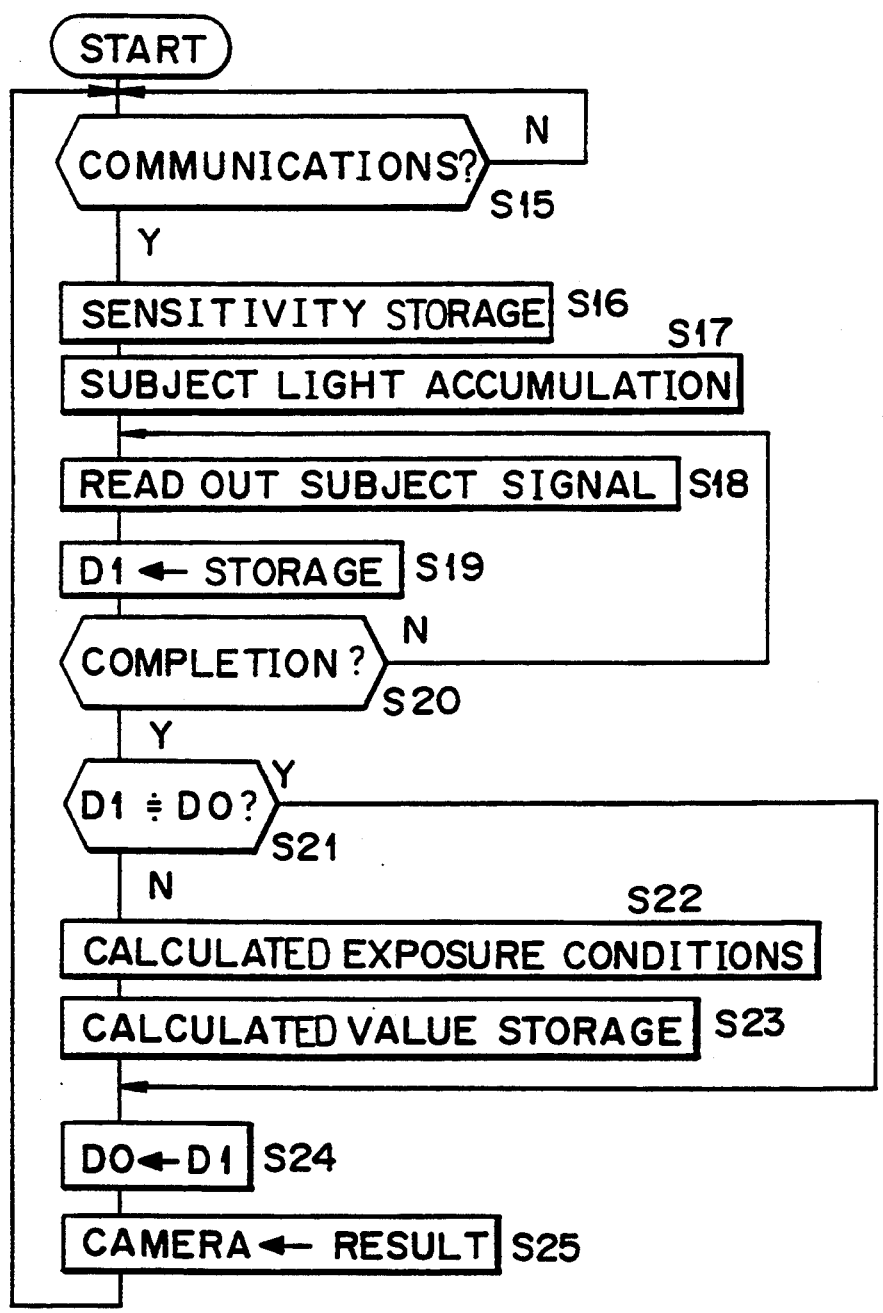
FIG. 7 is a flow chart of the process occurring in the CPU within the viewfinder of the camera system in Figure

FIG. 7 illustrates the steps to be executed within the CPU 101 of the viewfinder 2 shown in FIG. 4. The FIG. 7 routine is repeatedly executed after the DC-DC converter 71 in the camera body 1 has commenced operation, and while power being fed to the viewfinder 2 through the contact point 93 is applied to the CPU 101. First, step S15 awaits handshaking for data communication to be initiated by the camera body 1. This preparation corresponds to the previously described action taken in step S2 by the camera body 1.

In step S16, the film sensitivity signal obtained from the camera body 1 is stored temporarily in the storage circuit 104.

Next, in step S17, the subject light is stored in the sensor 25 by the use of driver 102. This is an action in which each of the plural number of photocells in the sensor 25 stores in its microcapacitor element the charge generated by the subject light it has received. It takes a longer time to store the charge if the subject is darker. In step S18, when the driver 102 applies a predetermined driving signal to the sensor 25, the stored subject charge is read out in time series in the form of electrical signals and is input into the AD conversion input terminals of the CPU 101. Next, in step S19, the analog signals read out as described earlier are converted to digital signals in time series. The digital signals are stored in an Area D1 within the storage circuit 104. The Area D1 is a region in which the latest subject image signal is stored. In step S20, a determination is made as to whether all of the signals from the photocells in the sensor 25 have been received by the shortage circuit 104. Until the signals from all of the photocells have been received, the processes described in steps S18 and S19 are repeated.

When the signals for all the divided areas of the sensor 25 are determined to have been stored in the Area D1 in one storage operation in step S20, the process moves to step S21. In step S21, a determination is made as to whether the latest subject image signal data stored in the Area D1 is nearly identical with the subject image signal data stored in a previous process in an Area D0. The nearness of identity is a matter of choice, and depends on the particular application, type of camera, and need for accuracy in exposure level. For example, when a high degree of accuracy is required in exposure level, the amount of identity also should be high. Alternatively, when a lesser degree of accuracy in exposure level can be tolerated, a lesser amount of identity is acceptable. If the data in the Area D1 is nearly or substantially identical with the data in the Area D0, it is assumed that there has been no changes or almost no changes in the subject image.

In such a case, the computation which ordinarily follows is by-passed, and the process advances to step S24.

On the other hand, if the latest subject image signal data stored in the Area D1 in step S21 is found to be substantially different from the subject image signal data stored in the previous process in the Area D0, a computation process for obtaining the optimum exposure conditions is executed in step S22. In step S22, the computation is performed on the basis of all of the subject image signal data stored in the Area D1 and the film sensitivity signal stored in step S16, using a predetermined algorithm so that the optimum exposure conditions can be obtained. The optimum exposure conditions obtained by the computation process performed in step S22 are stored in the storage circuit 104 in step S23.

Next, the latest subject image signal data which have been stored in the Area D1 during step S19 is moved to the Area D0 in step S24. In the following step S25, handshaking for data communication with the camera body 1, which corresponds to step S3 in FIG. 6, is accomplished, and the signal for suitable exposure conditions obtained in step S23, which comprises the suitable exposure condition signal, is transmitted to the camera body 1. Subsequently the process returns to step S15, and the process described above is repeated.

In the above example, this invention is explained as applied to the light metering means for obtaining exposure conditions. However, the present invention is not limited to this application. The invention is equally effective if it is applied to a range-finding means for finding the state of focussing, for example.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

I claim:

1. An exposure meter system for a camera, comprising:
   light metering means for measuring light in divided areas of a subject image, said light metering means outputting a plurality of metered signals;
   computing means for performing computations using the plurality of metered signals output by the light metering means to calculate exposure data; and
   exposure control means for comparing the metered signals output by the metering means with previous metered signals obtained in a previous light metering operation, said exposure control means omitting the computations performed by said computing means when the compared metered signals and previous metered signals are substantially identical, said exposure control means then controlling an exposure process using previously calculated exposure data.

2. The system of claim 1, wherein said exposure control means includes a primary memory that stores the metered signals output by the light metering means, and a secondary memory that stores the previous metered signals, said exposure control means transferring said metered signals from the primary memory to the secondary memory to replace the previous metered signals after said exposure control means compares said metered signals with said previous metered signals.

3. The system of claim 1, wherein the exposure data calculated by said computing means includes a shutter time and a lens aperture stop value.

4. A measuring system for a camera, comprising:
   a light measuring device that measures light of a subject image, said light measuring device outputting a measurement signal;
   a computing device that performs computations using the measurement signal output by the light measuring device to calculate control data; and
   a controller that compares the measurement signal output by the measuring device with a previous measurement signal obtained in a previous light measuring operation, said controller omitting the computations performed by said computing device when the compared measurement signal and the previous measurement signal are substantially identical, said controller then controlling a process performed by the camera using previously calculated control data.

5. The system of claim 4, wherein said light measuring device is a light meter.

6. The system of claim 5, wherein said computing device is a microprocessor located in said light meter, and said control data calculated by said computing device is exposure data.

7. The system of claim 6, wherein the exposure data calculated by said computing device includes a shutter time and a lens aperture stop value.

8. The system of claim 4, wherein said light measuring device measures light in divided areas of the subject image, said light measuring device outputting a plurality of metered signals as said measurement signal.

9. The system of claim 8, wherein said previous measurement signal is a plurality of previous metered signals, and said controller compares said plurality of metered signals with said plurality of previous metered signals to determine whether to omit the computations performed by said computing device when the compared metered signals and the previous metered signals are substantially identical.

10. The system of claim 4, wherein said controller includes a primary memory that stores the measurement signal output by the light measuring device, and a secondary memory that stores the previous measurement signal, said controller transferring said measurement signal from the primary memory to the secondary memory to replace the previous measurement signal after said controller compares said measurement signal with said previous measurement signal.

11. The system of claim 4, wherein said light measuring device measures light in divided areas of the subject image, said light measuring device outputting a plurality of said measurement signals.

12. The system of claim 11, wherein said previous measurement signal is a plurality of said previous measurement signals, and said controller compares said plurality of measurement signals with said plurality of previous measurement signals to determine whether to omit the computations performed by said computing device when the compared measurement signals and the previous measurement signals are substantially identical.

13. An exposure meter system for a camera, comprising:
- a light metering device that measures light in divided areas of a subject image, said light metering device outputting a plurality of metered signals;
- a first memory area that stores said plurality of metered signals;
- a second memory area that stores a plurality of previous metered signals, said previous metered signals having been measured by said light metering device at a time prior to measurement of said metered signals by said light metering device;
- a computing device that performs computations using the plurality of metered signals output by the light metering device to calculate exposure data;
- an exposure data memory area that stores previous exposure data calculated by said computing device using said previous metered signals; and
- a controller that compares the metered signals output by the light metering device with the previous metered signals stored in said second memory area, said controller outputting the previous exposure data stored in said exposure data memory area when the compared metered signals and previous metered signals are substantially identical.

14. The system of claim 13, wherein said controller transfers said metered signals from the first memory area to the second memory area to replace the previous metered signals after said controller compares said metered signals with said previous metered signals.

15. The system of claim 13, wherein the exposure data calculated by said computing device includes a shutter time and a lens aperture stop value.

* * * * *